(12) United States Patent
Krowas et al.

(10) Patent No.: US 8,239,302 B2
(45) Date of Patent: *Aug. 7, 2012

(54) MINIMIZING SECURITY HOLDINGS RISK DURING PORTFOLIO TRADING

(75) Inventors: John Krowas, Boston, MA (US); Ian Domowitz, New York, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/042,052

(22) Filed: Mar. 7, 2011

(65) Prior Publication Data

US 2011/0218935 A1 Sep. 8, 2011

Related U.S. Application Data

(63) Continuation of application No. 10/376,599, filed on Mar. 3, 2003, now Pat. No. 7,904,365.

(51) Int. Cl.
G06Q 40/00 (2012.01)
(52) U.S. Cl. .......................... 705/35; 705/37
(58) Field of Classification Search ............... 705/35–45
See application file for complete search history.

(56) References Cited

U.S. PATENT DOCUMENTS

| | | | |
|---|---|---|---|
| 5,799,287 | A | 8/1998 | Dembo |
| 6,003,018 | A | 12/1999 | Michaud et al. |
| 6,275,814 | B1 | 8/2001 | Giansante et al. |
| 6,311,169 | B2 | 10/2001 | Duhon |
| 6,493,682 | B1 | 12/2002 | Horrigan et al. |
| 6,829,590 | B1 | 12/2004 | Greener et al. |
| 7,613,647 | B1 * | 11/2009 | Cushing et al. ............. 705/37 |
| 2002/0002521 | A1 | 1/2002 | Shearer et al. |
| 2002/0023043 | A1 | 2/2002 | Samukawa et al. |
| 2002/0046145 | A1 | 4/2002 | Ittai |
| 2002/0082967 | A1 | 6/2002 | Kaminsky |
| 2002/0091605 | A1 | 7/2002 | Labe, Jr. et al. |
| 2002/0103742 | A1 | 8/2002 | Billings et al. |
| 2002/0120524 | A1 | 8/2002 | Smith |
| 2002/0138371 | A1 | 9/2002 | Lawrence et al. |
| 2002/0138401 | A1 | 9/2002 | Allen et al. |
| 2002/0138407 | A1 | 9/2002 | Lawrence et al. |
| 2002/0138408 | A1 | 9/2002 | Lawrence |
| 2002/0138417 | A1 | 9/2002 | Lawrence |

(Continued)

FOREIGN PATENT DOCUMENTS

EP 0790568 A1 8/1997

(Continued)

OTHER PUBLICATIONS

"A Simplified Model for Portfolio Analysis", William F. Sharpe, Management Science, vol. 9, No. 2 (Jan. 1963) pp. 277-293.

*Primary Examiner* — Richard C Weisberger
(74) *Attorney, Agent, or Firm* — Rothwell, Figg, Ernst & Manbeck, P.C.

(57) ABSTRACT

A method and computer program product for minimizing short-term risk to a portfolio of securities holdings during implementation of executing an outstanding trade list of securities to be traded, takes into account covariances between securities in the outstanding trade list and between securities in the outstanding trade list and securities in the portfolio of holdings so as to minimize risk to the portfolio of holdings as well as to a residual trade list of unexecuted orders during said implementation.

20 Claims, 2 Drawing Sheets

U.S. PATENT DOCUMENTS

| | | |
|---|---|---|
| 2002/0147671 A1 | 10/2002 | Sloan et al. |
| 2002/0174042 A1 | 11/2002 | Arena et al. |
| 2002/0174047 A1 | 11/2002 | Fernholz |
| 2002/0178046 A1 | 11/2002 | Lawrence |
| 2003/0014347 A1 | 1/2003 | Tiefenbrun |
| 2003/0014356 A1 | 1/2003 | Browne et al. |
| 2003/0023543 A1 | 1/2003 | Gunewardena et al. |
| 2003/0028462 A1 | 2/2003 | Fuhrman et al. |
| 2003/0105702 A1 | 6/2003 | Long, III et al. |
| 2003/0177077 A1 | 9/2003 | Norman |
| 2003/0182224 A1 | 9/2003 | Horrigan et al. |
| 2003/0208427 A1 | 11/2003 | Peters et al. |
| 2003/0233306 A1 | 12/2003 | Madhavan et al. |
| 2004/0039675 A1 | 2/2004 | Wallman |
| 2004/0064393 A1 | 4/2004 | Luenberger |
| 2004/0078319 A1 | 4/2004 | Madhavan et al. |
| 2004/0128222 A1 | 7/2004 | Turbeville et al. |
| 2004/0167843 A1 | 8/2004 | French |
| 2004/0181479 A1 | 9/2004 | Zosin et al. |
| 2004/0186804 A1 | 9/2004 | Chakraborty et al. |
| 2004/0199447 A1 | 10/2004 | Treynor |
| 2004/0199452 A1 | 10/2004 | Johnston et al. |
| 2004/0205018 A1 | 10/2004 | Degraaf et al. |
| 2005/0004857 A1 | 1/2005 | Schwarz |

FOREIGN PATENT DOCUMENTS

| | | |
|---|---|---|
| EP | 0985188 B1 | 3/2000 |
| WO | 0241120 A2 | 5/2002 |
| WO | 02079923 A2 | 10/2002 |

* cited by examiner

MINIMIZING SECURITY HOLDINGS RISK DURING PORTFOLIO TRADING

This application is a Continuation of and claims priority to U.S. patent application Ser. No. 10/376,599, filed Mar. 3, 2003, the entire contents of which are incorporated herein by reference in their entirety.

FIELD OF THE INVENTION

This invention relates generally to trading strategies in securities markets. Particularly, the invention relates to a system and method for minimizing the overall risk to a portfolio of financial security holdings during execution of a trade list of a large number of securities.

BACKGROUND OF THE INVENTION

A securities trading mechanism can be thought of as a set of protocols that translate investors' latent demands into realized prices and quantities. Various automated trading systems are known, which execute so-called "program" trading strategies in response to market movements.

Traders for large institutional investors such as mutual funds, hedge funds, etc. face a dilemma. On the one hand, they are responsible for trading large blocks of stocks and cannot afford to send large market orders that will result in adverse market impact and inferior execution prices. On the other hand, they require a certain degree of immediacy to be able to complete their trades within a defined time horizon. It is therefore typical for such traders to utilize a trading strategy to complete execution of a trading list of a large number of different securities within a specified or given time frame, wherein multiple smaller orders for portions of the trading list are sent over the given time frame according to a predefined trading strategy model that minimizes the risk to the unexecuted portion of the trading list of unfavorable market movements caused by execution of the smaller orders.

One such known trading risk objective strategy treats the unexecuted trade list as a long-short portfolio and utilizes a multi-factor risk model to construct a minimal risk "portfolio" of unfilled orders to be sent simultaneously for execution. The "portfolio" of unfilled orders when executed minimizes the risk to short-term return of the unexecuted trade list.

The Markowitz Model (as described in "Portfolio Selection," Dr. H. M. Markowitz, *Journal of Finance*, Mar. 7, 1952), is an optimization model that balances the expected return and risk of a portfolio to allow the construction of a minimal risk portfolio. The decision variables are the amounts invested in each asset. According to this model, the statistical variance a stock's price is used as a measure of its risk, the expected return of the stock is used as a measure of its utility or long-term prospects, and the variance of a portfolio's return is derived from the covariances for the returns of the individual assets in the portfolio.

Variance is a measure of the fluctuation in the rate of return, where higher variances indicate riskier investments, while covariance is a measure of the correlation of return fluctuations of one asset (e.g., stock) with the return fluctuations of another. A high covariance between two stocks indicates that an increase in one stock's return is likely to correspond to an increase in the other stock's return, a low covariance indicates that the return rates of the two stocks are relatively independent, and a negative covariance indicates that an increase in one stock's return is likely to correspond to a decrease in the other stock's return. Thus, the risk of a portfolio is not determined by a simple weighted average of the risks of individual assets in the portfolio, but instead is determined by the mutual relation between the returns of individual assets in the portfolio.

A shortcoming of the known trading risk objective model is that it fails to take into account the short-term effect that each trade has on the overall portfolio of holdings, which includes securities held but not traded as well as the unexecuted trade list of securities. Because portfolio managers are evaluated on the variance of their holdings' return, the actions of a trader using the known trading risk model may have an adverse effect on the short-term risk/return of the overall portfolio of holdings, since the trader is unaware of the portfolio's untraded holdings. Here, it is assumed that there is little coupling between the long-term utility of the portfolio upon which the trade list is based, and the short-term utility that can be maximized using the trade strategy.

There thus exists a need for improvements in the art to provide for control of the short-term risk of the overall holdings of a portfolio upon which a trade list is based.

SUMMARY OF THE INVENTION

The present invention provides a method and computer program product for minimizing short-term risk to a portfolio of securities holdings during implementation of executing an outstanding trade list of securities to be traded, including computer-executable instructions stored on a computer-readable storage medium, including a computer program module for determining covariances between securities in the outstanding trade lis and between securities in the outstanding trade list and securities in the portfolio of holdings; a computer program module for receiving a quantity representing a portion of said trade list desired to be executed at a particular time; a computer program module for determining a residual trade list of securities not to be traded at said particular time based on said covariances and said received quantity, which results in a minimum risk to said residual trade list and to said portfolio of securities holdings; and a computer program module for determining an execution trade list including identities and quantities of securities to be traded at said particular time by subtracting said residual trade list from said outstanding trade list.

According to another aspect of the invention, a method is provided that includes the steps performed by the computer program product.

The present invention will become more fully understood from the forthcoming detailed description of preferred embodiments read in conjunction with the accompanying drawings. Both the detailed description and the drawings are given by way of illustration only, and are not limitative of the present invention as claimed.

DETAILED DESCRIPTION OF THE PREFERRED EMBODIMENTS

Figure 2:
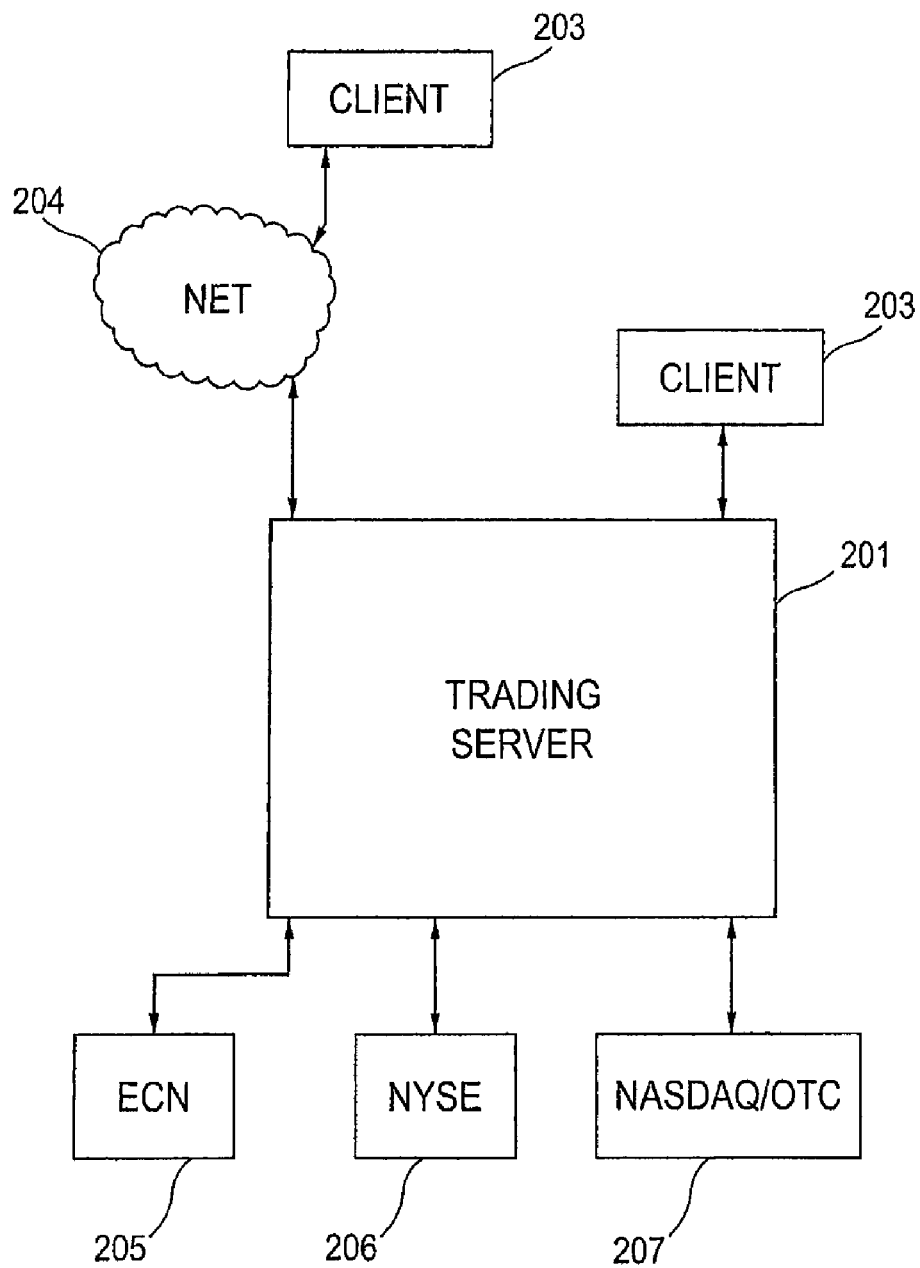
FIG. 2 is a block diagram of a system for implementing the process shown in FIG. 1.

As shown in FIG. 2, the trading risk model is implemented by a server 201, which is in communication with various exchanges, such as an Electronic Communication Network (ECN) 205, the New York Stock Exchange 206, the NAS- DAQ/OTC market 207, and other like markets/exchanges. A client 202 is composed of a PC, workstation or similar device, and may be directed coupled to the server 201; other clients, such as client 203, are coupled to the server 201 through a distributed communication network 204, which may be the Internet, a Wide Area Network (WAN), a Local Area Network (LAN), or any other similar type of communication network.

Figure 1:
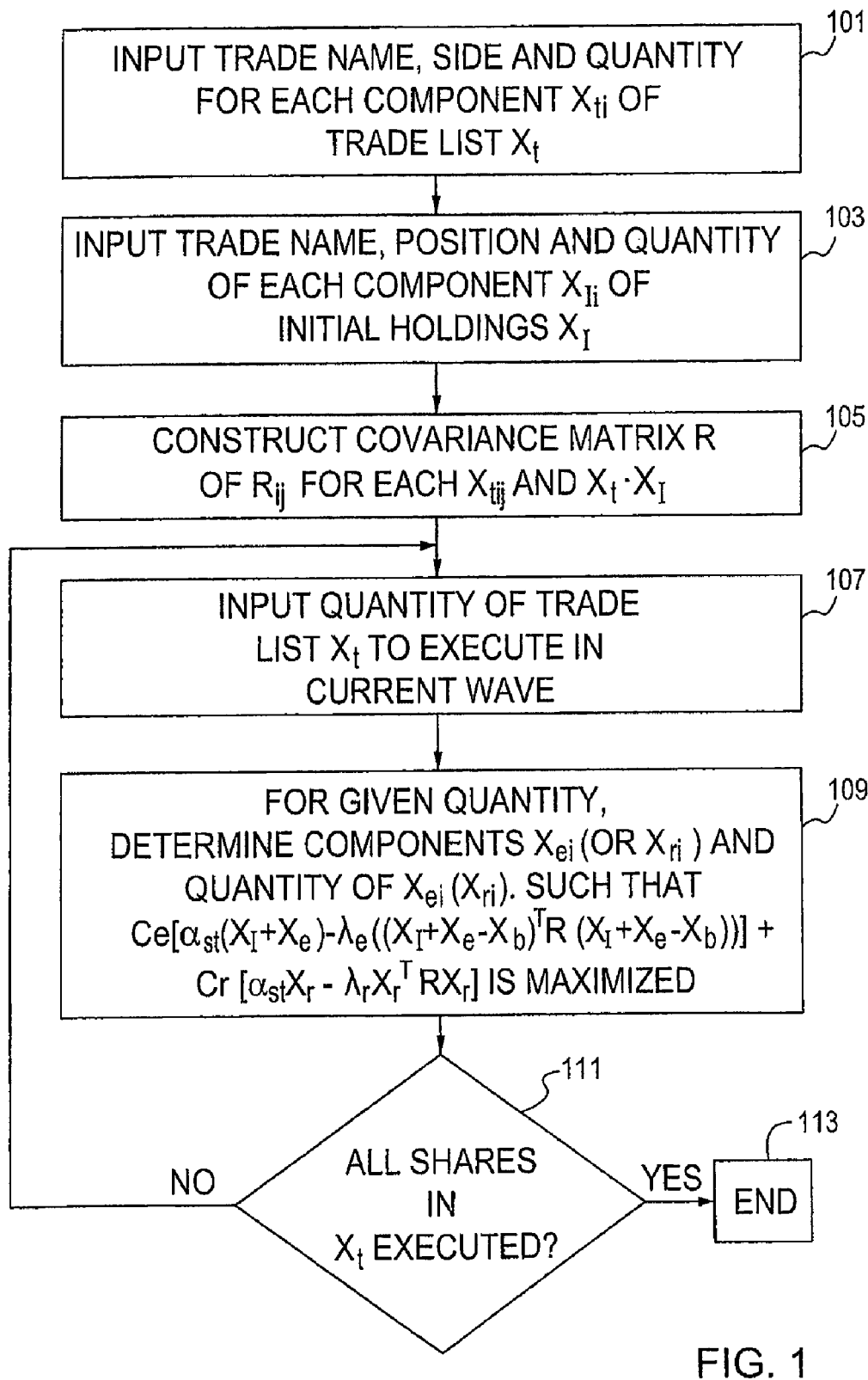
FIG. 1 is a flow diagram of a process for determining a minimal risk residual trade list according to a preferred embodiment of the present invention.

Referring to FIG. 1, at step 101 a trader or other user inputs to the server 201 the trade name (e.g., stock name or symbol), trading side (i.e., buy or sell) and quantity (e.g., dollar amount or number of shares) for each component $X_{ti}$ of a desired trade list $X_t$. Here, buys may be denoted by a positive (+) sign and sells may be denoted by a negative (−) sign. At step 103, the trader or user inputs the trade name, side (i.e., long or short) and quantity of each component $X_{fi}$ of a portfolio of initial holdings $X_f$. Again, long positions may be denoted by a positive (+) sign and short positions may be denoted by a negative (−) sign.

At step 105, a covariance matrix R is constructed containing the covariance $R_{ij}$ for the components $X_{tij}$ in the trade list, and the covariance $R_{ij}$ for the components in $X_t$ against the components in $X_f$. The covariance Rij between any two trade names can be determined from historical trading data.

Next, at step 107 the quantity of shares (in terms of dollar amount or share amount) desired to be traded in a current wave are inputted. This number may be determined in accordance with a specific trading strategy used by the trader (i.e., automated trade strategy or manually implemented) taking into account various market data parameters. Such trading strategies are generally well known in the art and thus wilt not be further discussed herein.

Once the quantity of shares to be executed in a current wave is inputted, at step 109 the components $X_{ei}$ of an execution trade list $X_e$ are determined that will minimize the risk to the resulting residual trade list $X_r$ as well as the static portion of the overall portfolio (which consists of the initial holdings $X_f$, plus any holdings $X_e$ acquired in previous waves. Since the expected return terms are linear and $X_t$ is fixed, it is equivalent to determine the components $X_{ri}$ of the residual trade list $X_r$.

The risk associated with the residual portfolio holdings may be represented by the matrix term $$X_r^T R X_r$$

wherein all of the covariances among the residual securities are summed. Similarly, the risk associated with the residual-plus-static portfolio holdings may be represented by the matrix term $$(X_f + X_e - X_b)^T R (X_f + X_e - X_b)$$

wherein $X_b$ is a benchmark term (which may be zero).

Here, the notion of short term return $\alpha_{st}$ for each of the components of the residual trade list and the static holdings is defined as the expected return over the time during which the trade list $X_t$ is implemented. For the purposes of the present invention, this notion of short-term return is separated from any long-term return prediction that resulted in the choice of the trade list $X_t$ in the first instance. Similarly, the notion of short-term risk $\lambda_{st}$ for each of the components is defined as an expected risk over the time that the trade list is implemented.

An objective function may now be constructed of the form $$c_e[\alpha_{st}(X_f + X_e) - \lambda_{st}((X_f + X_e - X_b)^T R (X_f + X_e - X_b))] + c_r[\alpha_{st} X_r - \lambda_{st} X_r^T R X_r]$$

which takes into account the short-term interests of both the trader and the portfolio manager. The constants $c_e$ and $c_r$ may be used to bias the solution towards the overall holdings or the residual trade list. The objective function is solved for its maximum value so as to determine a minimal risk residual trade list Xr (and thus an execution portion Xe) which also takes into account the short-term risk to the portfolio holdings.

At step 111, it is determined whether the entire trade list Xt has been completed. If so, the process ends at step 113; if not, the process returns to step 107 to input the quantity desired for the next trading wave.

As indicated in the above equations, the short-term risks and returns are "taken into account" by including terms in the equations corresponding to each of the risks/returns to be considered when creating the minimal risk residual trade list or execution list.

EXAMPLE

Suppose that a portfolio includes a short position of $2000 of IBM, and long positions of $1000 of CSCO and $1000 of GM. A trade list $X_t$ is to sell $1000 of GM, sell $1000 of CSCO, and buy $2000 of HPQ. Each component $X_{ti}$ is the signed value of the ith stock we wish to trade. Thus, $X_{t1}=1000$, $X_{t2}=1000$, and $X_{t3}=-2000$ (where unfilled buys are negative and unfilled sells are positive. In other words, we are "short" our unfilled buys and "long" our unfilled sells). The covariance matrix R will reflect the fact that the covariance of CSCO and HPQ is high, the covariance of GM and HPQ and GM and CSCO are both low, and the covariance of IBM and HPQ and IBM and CSCO are both high. In other words, CSCO, HPQ and IBM price movements have a positive correlation, while there is little or no correation between the price movement of GM and any of IBM, CSCO and HPQ. The short position of IBM is represented as −2000. Mathematically, the covariance $R_{23}$ is large, while $R_{12}$ and $R_{13}$ are small.

If we wish to complete half of the trade list in the current wave, the minimal risk residual portfolio Xr will consist of an outstanding sell order for $1000 of CSCO and an outstanding buy order for $1000 of HPQ (since the minimum risk to the trade list given that one-half of the list is to be implemented is to send the sell order for GM and half of the buy order for HPQ). Because the covariance IBM, CSCO and HPQ is also high, the holdings risk is quite low since the short position IBM holding is not adversely affected by the residual (open) sell order for CSCO. However, if we had a $2000 long position of IBM in the static part of the portfolio, the holdings' risk would be quite high because the holdings portfolio would consist entirely of technology stocks as long positions.

In this manner, the present invention simultaneously controls the risk of both the residual trade list and the overall holdings in the portfolio, and thus accounts for the interests of the portfolio manager as well as the trader.

The invention being thus described, it will be apparent to those skilled in the art that the same may be varied in many ways without departing from the spirit and scope of the invention. Any and all such modifications are intended to be included within the scope of the following claims.

The invention claimed is:

1. A method of minimizing short-term risk to a portfolio or securities holdings during implementation of executing an outstanding trade list of securities to be traded, comprising the steps of:
   determining, by a computer, covariances between securities in the outstanding trade list and between securities in the outstanding trade list and securities in the portfolio of holdings;

receiving, by a computer, via an electronic network, a quantity representing a portion of said trade list desired to be executed at a particular time;

determining, by a computer, a residual trade list of securities not to be traded at said particular time based on said covariances and said received quantity, which results in a minimum risk to said residual trade list and to said portfolio of securities holdings; and determining, by a computer, an execution trade list including identities and quantities of securities to be traded at said particular time by subtracting said residual trade list from said outstanding trade list.

2. The method of claim 1, wherein the step of determining said residual trade list takes into account a short-term return associated with said portfolio of holdings.

3. The method of claim 1, wherein the step of determining said residual trade list takes into account a short-term return associated with said execution trade list.

4. The method of claim 1, wherein the step of determining said residual trade list takes into account a short-term risk associated with said portfolio of holdings.

5. The method of claim 1, wherein the step of determining said residual trade list takes into account a short-term risk associated with said execution trade list.

6. A method of minimizing short-term risk to a portfolio of securities holdings during implementation of executing an outstanding trade list of securities to be traded, comprising the, steps of:

determining, by a computer, covariances between securities in the outstanding trade list and between securities in the outstanding trade list and securities in the portfolio of holdings;

receiving, by a computer, via an electronic network, a quantity representing a portion of said trade list desired to be executed at a particular time;

determining, by a computer, an execution trade list of securities to be traded at said particular time based on said covariances and said received quantity, which results in a maximum return to said execution trade list and to said portfolio of securities holdings; and determining, by a computer, a residual trade list including identities and quantities of securities not to be traded at said particular time by subtracting said execution trade list from said outstanding trade list.

7. The method of claim 6, wherein the step of determining said execution trade list takes into account a short-term return associated with said portfolio of holdings.

8. The method of claim 6, wherein the step of determining said execution trade list takes into account a short-term return associated with said execution trade list.

9. The method of claim 6, wherein the step of determining said execution trade list takes into account a short-term risk associated with said portfolio of holdings.

10. The method of claim 6, wherein the step of determining said execution trade list takes into account a short-term risk associated with said execution trade list.

11. A computer program product for minimizing short-term risk to a portfolio of securities holdings during implementation of executing an outstanding trade list of securities to be traded, comprising the following computer-executable instructions stored on a computer-readable storage medium:

a computer program module for determining covariances between securities in the outstanding trade list and between securities in the outstanding trade list and securities in the portfolio of holdings;

a computer program module for receiving a quantity representing a portion of said trade list desired to be executed at a particular time;

a computer program module for determining a residual trade list of securities not to be traded at said particular time based on said covariances and said received quantity, which results in a minimum risk to said residual trade list and to said portfolio of securities holdings; and a computer program module for determining an execution trade list including identities and quantities of securities to be traded at said particular time by subtracting said residual trade list from said outstanding trade list.

12. The computer program product of claim 11, wherein the program module for determining said residual trade list takes into account a short-term return associated with said portfolio of holdings.

13. The computer program product of claim 11, wherein the program module for determining said residual trade list takes into account a short-term return associated with said execution trade list.

14. The computer program product of claim 11, wherein the program module for determining said residual trade list takes into account a short-term risk associated with said portfolio of holdings.

15. The computer program product of claim 11, wherein the program module for determining said residual trade list takes into account a short-term risk associated with said execution trade list.

16. A computer program product for minimizing short-term risk to a portfolio of securities holdings during implementation of executing an outstanding trade list of securities to be traded, comprising the following computer-executable instructions stored on a computer-readable storage medium:

a computer program module for determining covariances between securities in the outstanding trade list and between securities in the outstanding trade list and securities in the portfolio of holdings;

a computer program module for receiving a quantity representing a portion of said trade list desired to be executed at a particular time;

a computer program module for determining an execution trade list of securities to be traded at said particular time based on said covariances and said received quantity, which results in a maximum return to said execution trade list and to said portfolio of securities holdings; and a computer program module for determining a residual trade list including identities and quantities of securities not to be traded at said particular time by subtracting said execution trade list from said outstanding trade list.

17. The computer program product of claim 16, wherein the program module for determining said residual trade list takes into account a short-term return associated with said portfolio of holdings.

18. The computer program product of claim 16, wherein the program module for determining said residual trade list takes into account a short-term return associated with said execution trade list.

19. The computer program product of claim 16, wherein the program module for determining said residual trade list takes into account a short-term risk associated with said portfolio of holdings.

20. The computer program product of claim 16, wherein the program module for determining said residual trade list takes into account a short-term risk associated with said execution trade list.

* * * * *